(12) United States Patent
Sezginer

(10) Patent No.: US 7,088,451 B2
(45) Date of Patent: Aug. 8, 2006

(54) SCATTEROMETRY BY PHASE SENSITIVE REFLECTOMETER

(75) Inventor: Abdurrahman Sezginer, Los Gatos, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 11/256,764

(22) Filed: Oct. 24, 2005

(65) Prior Publication Data

US 2006/0033932 A1 Feb. 16, 2006

Related U.S. Application Data

(63) Continuation of application No. 10/387,772, filed on Mar. 13, 2003, now Pat. No. 6,985,232.

(51) Int. Cl.
*G01B 9/02* (2006.01)

(52) U.S. Cl. .................... 356/451; 356/497; 356/510

(58) Field of Classification Search ............... 356/451, 356/479, 497, 485, 508–510, 486, 487, 489, 356/490, 492, 495, 511, 512
See application file for complete search history.

(56) References Cited

U.S. PATENT DOCUMENTS

| 4,818,110 A |   | 4/1989 | Davidson |
|---|---|---|---|
| 5,042,949 A |   | 8/1991 | Greenberg et al. |
| 5,112,129 A |   | 5/1992 | Davidson et al. |
| 5,546,185 A | * | 8/1996 | Okumura et al. ........... 356/452 |
| 5,565,986 A |   | 10/1996 | Knuttel |
| 5,734,471 A | * | 3/1998 | Nakata ........................ 356/508 |
| 5,923,423 A |   | 7/1999 | Sawatari et al. |
| 6,088,100 A |   | 7/2000 | Brenan et al. |
| 6,198,532 B1 |   | 3/2001 | Cabib et al. |
| 6,529,278 B1 | * | 3/2003 | Kato ........................... 356/498 |
| 6,665,075 B1 |   | 12/2003 | Mittleman et al. |
| 6,985,232 B1 | * | 1/2006 | Sezginer ..................... 356/451 |
| 2002/0113973 A1 | * | 8/2002 | Ge ............................... 356/510 |

OTHER PUBLICATIONS

B. Bhushan et al., "Measurement of surface topography of magnetic tapes by Mirau interferometry," *Applied Optics*, vol. 24, No. 10, May 15, 1985, pp. 1489-1497.

J.F. Valley et al., "Interferometric metrology of wafer nonotopography for advanced CMOS process integration," *Proceedings of SPIE—Optical Metrology Roadmap for the Semiconductor, Optical, and Data Storage Industries II*, vol. 4449 (2001), pp. 160-168.

* cited by examiner

*Primary Examiner*—Gregory J. Toatley, Jr.
*Assistant Examiner*—Patrick Connolly
(74) *Attorney, Agent, or Firm*—Stallman & Pollack LLP

(57) ABSTRACT

A phase-sensitive interferometric broadband reflectometer includes an illumination source for generating an optical beam. A beam splitter or other optical element splits the optical beam into probe beam and reference beam portions. The probe beam is reflected by a subject under test and then rejoined with the reference beam. The combination of the two beams creates an interference pattern that may be modulated by changing the length of the path traveled by the probe or reference beams. The combined beam is received and analyzed by a spectrometer.

18 Claims, 3 Drawing Sheets

SCATTEROMETRY BY PHASE SENSITIVE REFLECTOMETER

CLAIM OF PRIORITY

The present application is a continuation of U.S. patent application Ser. No. 10/387,772, filed Mar. 13, 2003, now U.S. Pat. No. 11/256,764 which is hereby incorporated herein by reference.

TECHNICAL FIELD OF THE INVENTION

The subject invention relates to optical devices used to non-destructively evaluate semiconductor wafers. In particular, the present invention relates to interferometry methods for measuring critical dimensions and film properties.

BACKGROUND

As geometries continue to shrink, manufacturers have increasingly turned to optical techniques to perform non-destructive inspection and analysis of semi-conductor wafers. The basis for these techniques is the notion that a subject may be examined by analyzing the reflected energy that results when a probe beam is directed at the subject. Ellipsometry and reflectometry are two examples of commonly used optical techniques. For the specific case of ellipsometry, changes in the polarization state of the probe beam are analyzed. Reflectometry is similar, except that changes in magnitude are analyzed. Scatterometry refers to determining properties of the subject from reflectometry and ellipsometry measurements, when the subject scatters or diffracts the probe beam. Such a subject, for example, is the developed photoresist mask applied to a wafer in order to etch a pattern into one of the layers on the wafer. The pattern, for example, can be isolated or densely arrayed lines or holes.

Techniques of this type may be used to analyze a wide range of attributes. This includes film properties such as thickness, crystallinity, composition and refractive index. Typically, measurements of this type are made using reflectometry or ellipsometry as described more fully in U.S. Pat. Nos. 5,910,842 and 5,798,837 both of which are incorporated in this document by reference. Critical dimensions (CD) including spacing, width, height and profile of lines or holes are another class of attributes that may be analyzed. Measurements of this type may be obtained using monochromatic scatterometry as described in U.S. Pat. Nos. 4,710,642 and 5,164,790 (McNeil). Another approach is to use broadband light to perform multiple wavelength spectroscopic reflectometry measurements. Examples of this approach are found in U.S. Pat. No. 5,607,800 (Ziger); U.S. Pat. No. 5,867,276 (McNeil) and U.S. Pat. No. 5,963,329 (Conrad). Still other tools utilize spectroscopic ellipsometric measurement. Examples of such tools can be found in U.S. Pat. No. 5,739,909 (Blayo) and U.S. Pat. No. 6,483,580 (Xu). Each of these patents and publications are incorporated herein by reference An ellipsometer measures the ratio of the amplitudes and the phase difference of reflection from the subject in two orthogonal polarizations. Let $r_P$ and $r_S$ denote the complex reflection coefficients of the subject for the polarizations where the electric field is in the plane of incidence (S) and perpendicular to the plane of incidence (P), respectively. An ellipsometer measures $|r_P|/|r_S|$ and angle($r_P$)-angle($r_S$). A spectroscopic ellipsometer measures these quantities for each wavelength, over a range of wavelengths. Ellipsometers do not measure $|r_P|$, $|r_S|$, angle($r_P$), angle($r_S$) separately. Therefore, ellipsometers do not require absolute amplitude or path length calibrations and they are not sensitive to drifts in those quantities. On the other hand, an ellipsometer owes its precision to not attempting to measure difficult to measure quantities, which nevertheless contain information about the subject. One objective of embodiments described herein is to measure $|r_P|$, $|r_S|$; and angle($r_P$), angle($r_S$) separately, up to an arbitrary path length.

For interferometry, an optical beam is subdivided into two portions before reaching the subject. The first portion is reflected by the subject. The second portion is recombined with the first portion after the first portion has been reflected. The recombination creates interference between the first and second beam portions. The interference may be modulated by changing the optical path traveled by one of the two beam portions either by changing the distance or the refractive index.

As described in U.S. Pat. No. 5,923,423 (Sawatari) interferometry has been used to scan un-patterned wafers for particles and defects.

White-light interferometry combined with imaging, also called coherence probe microscopy, may also be used to characterize critical dimensions, such as line spacing, line width, wall depth, and wall profiles. Applications of this nature are described in U.S. Pat. No. 4,818,110 (Davidson) and U.S. Pat. No. 5,112,129 (Davidson). Each of these patents and publications are incorporated herein by reference. In each of these applications, an image of the subject under test is constructed. The image shows the magnitude of the energy reflected by the subject modified by a pattern of interference. Multiple images are captured as the phase of the interference is modulated. The dimension that is perpendicular to the wafer is probed by interferometry to locate the top and bottom boundaries of three-dimensional features. The dimensions in the plane of the wafer are obtained from the image; therefore, such measurements are limited by the resolution of the optical imaging system.

Broadband coherent interferometry is used to map nanometer-scale surface topography of wafers (B. Bhushan, J. C. Wyant, and Chris Koliopoulos, "Measurement of surface topography of magnetic tapes by Mirau interferometry," Applied Optics, Vol. 24, No. 10, 1489–1497, 15 May 1985; J. F. Valley, C. L. Koliopoulos, S. Tang, Proc. SPIE Vol. 4449, p. 160–168, Optical Metrology Roadmap for the Semiconductor, Optical, and DataStorage Industries II, A. Duparre, B. Sing, Eds., SPIE Press, Bellingham, Wash., December 2001) These techniques measure nanometer-scale of topography in the direction that is perpendicular to the wafer but they are limited by the resolution of the microscope, on the order of 0.5 micrometers for visible-light microscopy, in the plane of the wafer.

Currently, scatterometry measures dimensions in the plane of the wafer with a precision that is an order of magnitude higher compared to microscopy techniques that use a similar wavelength range. An objective of embodiments described herein is to further advance the performance of scatterometry by measuring individual amplitudes and phases of the p- and s-polarizations up to an arbitrary path length. Absolute phases of the s- and p-polarizations are not measurable because such a measurement would be sensitive to minute (10 nanometer scale) changes in the optical path length. Thermal expansion and vibration preclude absolute phase measurements. An objective of embodiments described herein is to measure the phase of the reflections in the p- and s-polarizations, for a range of wavelengths, up to an uncertain path length that is constant during the acquisition of at least one data set.

BRIEF SUMMARY

Embodiments of the present invention can provide a spectroscopic, interferometric, broadband reflectometer. Such an interferometer can include an illumination source that generates an optical beam. The optical beam is split into a reference beam and probe beam using a beam splitter or other appropriate optical element. The probe beam is reflected by a subject under test and the reflected probe beam is mixed with the reference beam. The mixed light is detected by a spectrometer with an array detector where each pixel of the array reads the intensity of a particular wavelength. The phase of the reference beam is modulated. The output of the detector is sampled synchronously with the modulation of the reference phase. The measurements are two-dimensional. The two dimensions are wavelength and depth of modulation. This yields the complex reflection coefficient spectrum of the specimen up to one arbitrary scalar. The arbitrary scalar corresponds to the path difference between the specimen and reference beams. The measurements are fitted to calculated complex reflectance of the subject. The calculation is based on a model of the subject. Parameters of the model such as layer thicknesses, line widths, line or hole profiles, and optical properties of materials are obtained by regression.

DETAILED DESCRIPTION

Figure 1:
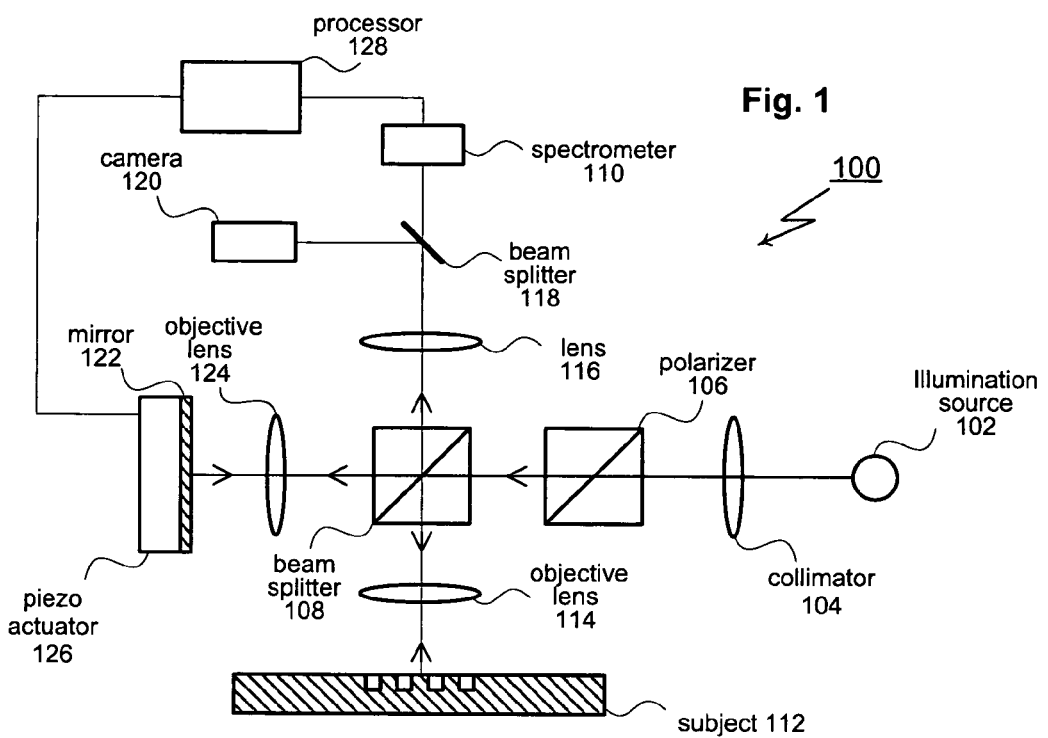
FIG. 1 is a diagram of a phase-sensitive interferometer as provided by an aspect of an embodiment of the present invention.

The embodiment of FIG. 1 provides a spectroscopic, phase-sensitive interferometer generally designated 100. Interferometer 100 includes a broadband illumination source 102 that directs a source beam through a collimator 104 and polarizer 106. A beam splitter 108 divides the source beam into separate probe beam and reference beam portions. The probe beam is received by a spectrometer 110 after being reflected by the subject 112 under test (and passing through objectives 114 and 116).

The probe beam travels along a path that causes it to be reflected by a subject 112 and then received by a spectrometer 110. For this particular implementation, the path traveled by the probe beam includes objective 114, imaging lens 116, and beam splitter 118. Other combinations of optical elements, for example, a reflective objective, are also possible. Typically, the probe beam passes through a system of wavelength dispersive optical elements (not shown) in spectrometer 110. In this way, each wavelength (or range of wavelengths) reaches a dedicated portion of spectrometer 110. The beam splitter 118 may have a pinhole (not shown) to pass the light to the spectrometer 110. The purpose of beam splitter 118 is to image the subject by camera 120. Camera 120 is used for the purposes of navigation, pattern recognition, alignment, and leveling the subject.

The reference beam travels along a path that causes it to be reflected by a mirror 122 and then recombined with the probe beam after the probe beam has been reflected by subject 112 (and before the probe beam reaches spectrometer 110). For the particular implementation of FIG. 1, the probe and reference beams are recombined using the same beam splitter 108 used to cause their separation. In the preferred implementation, an objective 124 is placed in the reference path. Objectives 114 and 124 are similar as possible so that they impart the same chromatic phase retardation. This arrangement is found in Linnik microscopes.

The position of mirror 122 is controlled by a piezo actuator 126. Both the piezo actuator 126 and the spectrometer operate under control of a processor 128. By changing the position of mirror 122, the length of the path traveled by the reference beam may be controlled. The recombination of the probe and reference beams creates interference between the two beams. Changing the path length traveled by the reference beam (i.e., moving mirror 122) modulates this interference. In general, it is also possible to modulate the interference pattern by varying the path length traveled by the probe beam while holding the path length traveled by the reference beam fixed. This can be done, for example by moving subject 112.

Processor 128 controls this modulation and synchronously samples the output of spectrometer 110. For typical implementations, spectrometer 110 includes a photodiode or CCD array that measures multiple wavelengths simultaneously. This enables processor 128 to obtain samples from spectrometer 110 that are resolved in both time and wavelength.

Processor 128 calculates a complex reflection coefficient r(k) for each subject 112 that is measured. r(k) is related to the output S(k,x) of spectrometer 110 by the following equation:

$$S(k,x)=\int |A(k')r(k')+B(k')e^{2\pi i(x+\Delta s)k'}|^2 psf(k,k')dk' \quad (1)$$

In Equation (1), x represents the displacement of mirror 122 and can be positive or negative. $\Delta s$ is the unknown difference between the optical path lengths traveled by the reference beam and the probe beam. $\Delta s$ is unknown because it can change each time the specimen is loaded in the instrument. $\Delta s$ may drift due to thermal expansion and mechanical deformation in the instrument. This embodiment is predicated on the premise that $\Delta s$ remains constant during acquisition of one set of data.

A(k) and B(k) are complex valued functions of wave number $k=2\pi/\lambda$ where $\lambda$ is the wavelength. The complex numbers A(k) and B(k) indicate the optical efficiency and phase retardation that the probe and reference beams encounter along their respective paths. psf(k,k') is the point spread function of spectrometer 110 and is defined as the relative sensitivity of the pixel centered at wavenumber k to light at wavenumber k'. Typically psf(k,k')≅psf(k'−k) is a function of the difference between the wavenumbers k and k' to a good approximation. The following normalization is used:

$$\int psf(k-k')dk' = 1 \quad (2)$$

Assuming the point spread function varies faster than A(k), r(k), and B(k), yields:

$$S(k,x) \cong |A(k)|^2|r(k)|^2 + |B(k)|^2 + + 2\int Re[A(k')B(k')r(k')e^{2\pi i(x+\Delta s)k'}]psf(k'-k)dk' \quad (3)$$

or:

$$S(k,x) \cong |A(k)|^2|r(k)|^2 + |B(k)|^2 + 2|A(k)||B(k)||r(k)|\cos\{angle[A(k)] - angle[B(k)] + angle[r(k)] - 2\pi(x+\Delta s)k\}PSF(x+\Delta s) \quad (4)$$

where angle [u+iv]=atan2(v,u) and (u+iv)*=(u−iv) for real u and v. PSF is the Fourier transform of the point spread function psf of the spectrometer:

$$PSF(x) = \int e^{-2\pi i k x} psf(k) dk \quad (5)$$

The preceding derivation assumes that psf (k) is an even function. As a result, PSF(x) is real and even. The point spread function psf(k,k')≅psf(k'−k) may be measured by illuminating the spectrometer with one or more light sources of very narrow spectral line width, such as lasers.

Optical efficiency $|A(k)|^2$ is determined by temporarily placing an absorbing beam dump (not shown) in the path between the beam splitter 108 and mirror 122, and using a calibration sample such as a bare silicon wafer in place of subject 112. Optical efficiency $|B(k)|^2$ is determined by temporarily placing an absorbing beam dump (not shown) in the path between the beam splitter 108 and subject 112. The phase difference angle [A (k)]−angle [B(k)] is determined by making measurements on one or more well-characterized calibration samples. A bare silicon wafer, thermal oxide film on silicon wafer are suitable calibration samples because optical properties of these materials are well known.

When $|A(k)|^2$, $|B(k)|^2$, angle[A(k)]−angle[B(k)], and psf (k) are known, measurement of S(k,x) yields the complex reflection coefficient r(k) of the subject 112 according to Equation (4).

There is one degree of freedom that is not determined by calibration and measurement. This is the path difference Δs, which effectively shifts the modulation x-axis by an unknown amount. Fortunately, the arbitrary parameter Δs is common to all wavelengths and may be obtained during regression and discarded. Alternatively it can be used to map the surface topography of the specimen, which is an existing, proven application of the broadband interferometer.

The interferometric determination of the complex r(k) requires the subject to have negligible tilt, much less than one wavelength within the measurement spot of the instrument. This can be achieved by leveling the subject so that the interference fringes seen by camera 120 have the least possible spatial frequency on an un-patterned part of subject 112.

During normal operation, polarizer 106 is configured so that the probe beam has an S-polarization. In cases where the subject 112 includes a line grating, the S-polarization means that the grating lines may be oriented parallel to the probe beam's electric field. This orientation maximizes the sensitivity of the measurement to the grating parameters. It is also possible to measure the reflection coefficient of the P-polarization instead of the S-polarization. This can be achieved by rotating polarizer 106 or subject 112 by 90 degrees from the orientation used for S-polarization. It is also possible to measure both P and S-polarizations, one at a time, by repeating the measurement at two orientations of polarizer 106 or subject 112 that are 90-degrees apart. The regression uses P and S-polarization data simultaneously.

Figure 2:
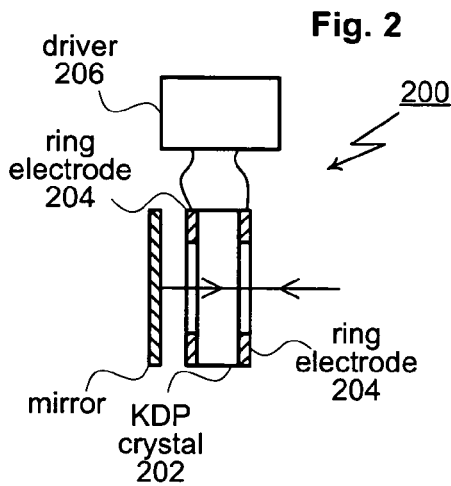
FIG. 2 is a diagram of an electro-optic modulator shown as a possible alternative for the piezo actuator included in the interferometer of FIG. 1.

As shown in FIG. 2, it is possible to replace piezo actuator 126 with an electro-optic modulator 200. Electro-optic modulators contain an optical material 202 that changes its refractive index as a function of electric field applied by electrodes 204. The voltage at electrodes 204 is controlled by processor 128 via driver 206. FIG. 2 shows a specific electro-optic modulator, a Pockels cell, with a KDP crystal. Kerr effect, neumatic crystals, ferro-electric materials provide alternative means of electro-optic modulation.

Figure 3:
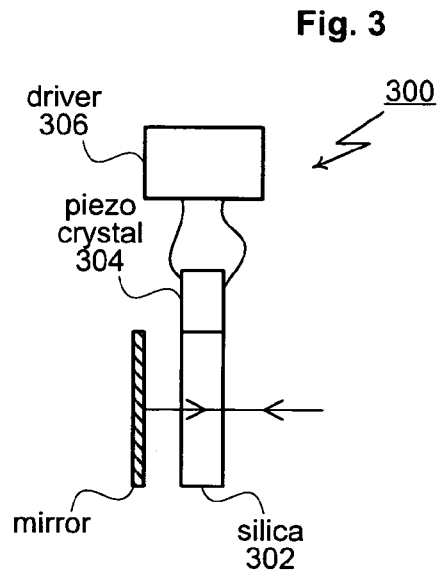
FIG. 3 is a diagram of a photo-elastic modulator shown as a possible alternative for the piezo actuator included in the interferometer of FIG. 1.

Piezo actuator 126 may also be replaced by a photo-elastic modulator 300 of the type shown in FIG. 3. Photo-elastic modulator 300 includes a silica element 302 and a piezo-electric crystal 304. Piezo-electric crystal 304 is connected to a driver 306. Processor 128 uses driver 306 to apply a varying electric voltage to piezo-electric crystal 304. This causes piezo-electric crystal 304 to deform, stressing silica element 302. Photo-elastic modulators typically operate at their mechanical resonance frequencies to produce sufficient stress. The resonance frequencies are typically on the order of 50 kHz. For this reason, photo-elastic modulator 300 can only be used if the array detectors and analog to digital converters included in spectrometer 110 are suitable for high-speed operation.

Figure 4:
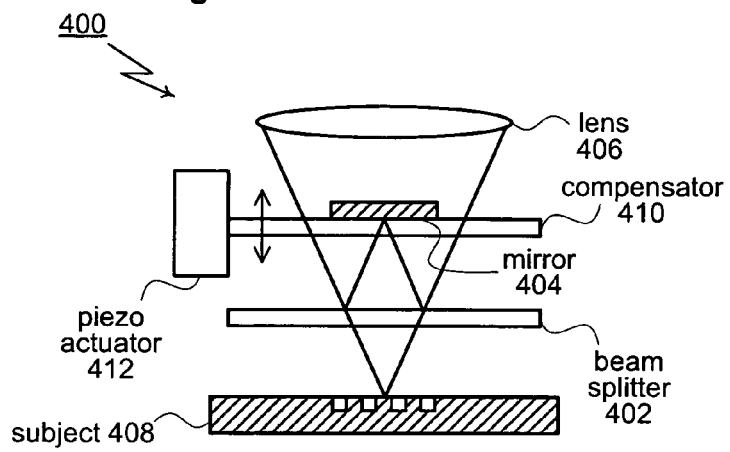
FIG. 4 shows an alternate architecture for an interferometer in accordance with one embodiment of the present invention.

As shown in FIG. 4, it is also possible to replace the configuration of interferometer 100 with the Mirau interferometer 400 as shown in FIG. 4. For interferometer 400, a beam splitter 402 and a reference mirror 404 are situated between an objective lens 406 and the subject 408. A compensator 410 equalizes the optical lengths of the reference and probe paths. The assembly of compensator 410 and mirror 404 are moved along the axis of objective lens 406 by an actuator 412. The Mirau interferometer has a unique advantage: objective 406 is common to the probe and reference beams. In fact, all optical components other than beam splitter 402 and compensator 410 are in the common path. The disadvantages of the Mirau configuration are that beam splitter 402 reduces the working distance and the intensity of the detected light compared to the Linnik configuration.

Figure 5:
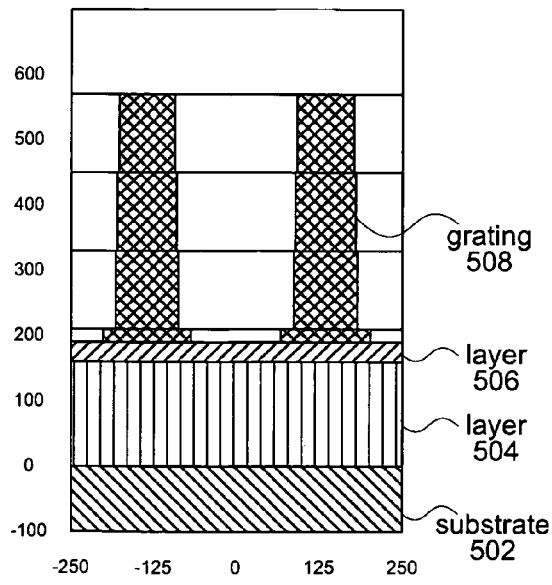
FIG. 5 is a cross-sectional representation of a wafer shown as a first representative subject for the interferometer in accordance with one embodiment of the present invention.

In FIG. 5, a wafer 500 is shown as a first representative subject for interferometer 100. Wafer 500 includes a 100 nm silicon substrate 502. Overlaying substrate 502 are: a 1.5 nm SiO2 layer (not shown), a 100 nm Poly-Si layer 504, a 5 nm SiO2 layer (not shown), a 30 nm SiON layer 506 and a 380 nm photo resist grating 508. Grating 508 has a line width of 90 nm (top CD of 85 nm, bottom CD of 95 nm) and a line pitch of 270 nm. The lines in grating 508 have a 20 nm footing.

Figure 6:
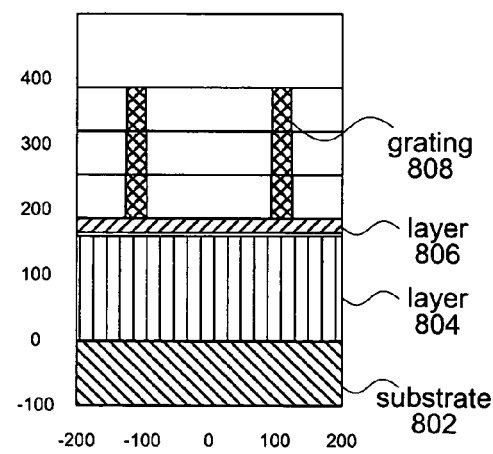
FIG. 6 is a cross-sectional representation of a wafer shown as a second representative subject for the interferometer in accordance with one embodiment of the present invention.

In FIG. 6, a wafer 600 is shown as a second representative subject for interferometer 100. Wafer 600 includes a 100 nm silicon substrate 602. Overlaying substrate 602 are: a 1.8 nm SiO2 layer (not shown), a 100 nm Poly-Si layer 604, a 8 nm SiO2 layer (not shown), a 22 nm SiON layer 606 and a 200 nm photo resist grating 608. Grating 608 has a line width of 30 nm (top CD of 28 nm, bottom CD of 32 nm) and a line pitch of 220 nm. Unlike wafer 500, the lines in grating 608 have no footing.

Figure 7:
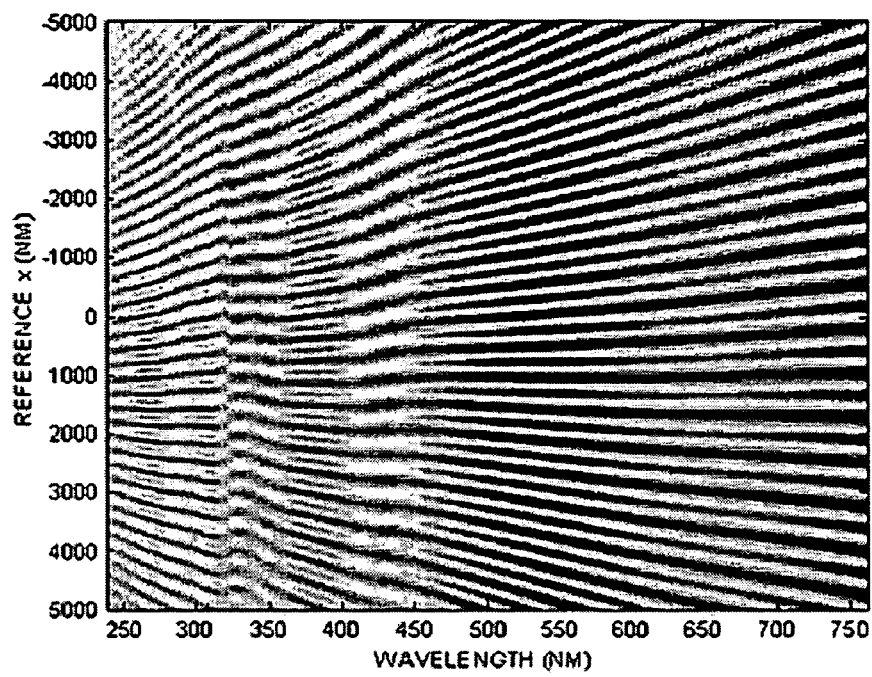
FIG. 7 is a chart showing simulated data as would be obtained by the phase-sensitive interferometer when analyzing the wafer of FIG. 5.
Figure 8:
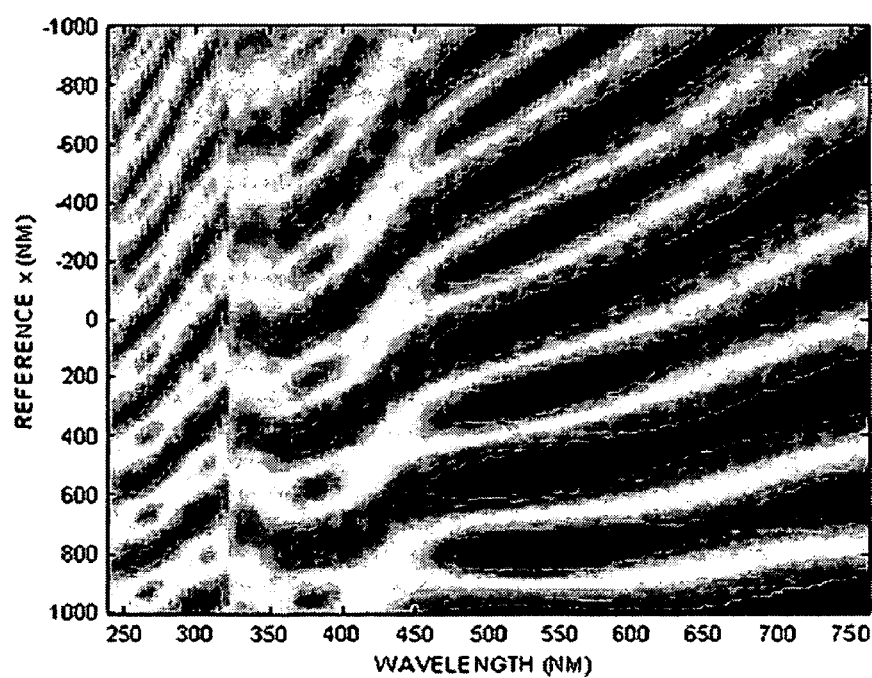
FIG. 8 is a chart showing simulated data as would be obtained by the phase-sensitive interferometer when analyzing the wafer of FIG. 5.

FIGS. 7 and 8 show simulated two-dimensional data $S(2\pi/\lambda,x)$ as would be generated by interferometer 100 for wafer 500. For this example, the instrument functions are set to A=½, B=1 and Δs=0. The point spread function is a Gaussian in the wavelength domain with FWHM=8 nm.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of optically leveling a subject to be inspected, comprising the steps of:
   generating a broadband optical beam;
   collimating the optical beam;
   splitting the optical beam into a probe beam and a reference beam;
   focusing the probe beam to be reflected by the subject;
   rejoining the probe beam and the reference beam after the probe beam has been reflected by the subject;
   directing a portion of the rejoined probe and references beams to a camera operable to capture interference fringes from the rejoined probe and references beams; and
   adjusting the tilt of the sample such that a spatial frequency of the interference fringes is minimized.

2. A method according to claim 1, wherein:
   the probe beam is focused onto an un-patterned surface region of the sample.

3. A method according to claim 1, further comprising:
   modulating the length of the path traveled by the probe beam or the reference beam within a predetermined range; and
   performing a spectroscopic analysis of the rejoined beams on a per-wavelength basis at a selected set of points within the predetermined range.

4. A method according to claim 3, further comprising:
   fitting results of the spectroscopic analysis to a theoretical model of the subject.

5. A method according to claim 3, further comprising:
   changing the position of a mirror to modulate the length of the path traveled by the probe beam or the reference beam within the predetermined range.

6. A method according to claim 1, further comprising:
   changing the refractive index of an optical component to effectively modulate the length of the path traveled by the probe beam or the reference beam within a predetermined range.

7. A method according to claim 1, further comprising:
   applying stress to an optical component to modulate the length of the path traveled by the probe beam or the reference beam within a predetermined range.

8. A device for optically leveling and inspecting a subject, the device comprising:
   an illumination source for generating a broadband optical beam;
   at least one optical element for splitting the optical beam into a probe beam and a reference beam, and rejoining the probe beam and the reference beam after the probe beam has been reflected by the subject;
   a camera for capturing interference fringes from the rejoined probe and references beams, an orientation of the sample being adjustable to minimize a spatial frequency of the interference fringes corresponding to a portion of the sample; and
   a spectrometer for analyzing the rejoined beams on a per-wavelength basis at a selected set of points.

9. A device according to claim 8, further comprising:
   an optical element for modulating the length of the path traveled one of the probe beam and the reference beam within a predetermined range.

10. A device according to claim 9, wherein:
    the selected set of points is within the predetermined range.

11. A device according to claim 8, further comprising:
    a second optical element for directing a portion of the rejoined probe and reference beams to the camera.

12. A device according to claim 8, further comprising:
    a processor for fitting results generated by the spectrometer to a theoretical model of the subject.

13. A device according to claim 8, further comprising:
    a movable mirror to modulate the length of the path traveled by one of the probe beam and the reference beam.

14. A device according to claim 8, further comprising:
    an electro-optic modulator operable to effectively modulate the length of the path traveled by one of the probe beam and the reference beam.

15. A device according to claim 8, further comprising:
    a photo-elastic modulator operable to modulate the length of the path traveled by one of the probe beam and the reference beam.

16. A method of optically inspecting and evaluating a subject, comprising the steps of:
    generating a broadband optical beam;
    collimating the optical beam;
    splitting the optical beam into a probe beam and a reference beam;
    focusing the probe beam to be reflected by the subject;
    rejoining the probe beam and the reference beam after the probe beam has been reflected by the subject;
    modulating the length of the path traveled by the probe beam or the reference beam within a predetermined range; and
    capturing an image of a portion of the rejoined probe and references beams to create interference fringes; and
    adjusting the tilt of the sample such that a spatial frequency of the interference fringes is minimized.

17. A method according to claim 16, further comprising:
    measuring the intensity of the rejoined beams as a function of path length and wavelength of light; and
    performing an analysis of the measured intensity to obtain reflection-phase information.

18. A method according to claim 17, wherein:
    the reflection-phase information includes a complex reflection coefficient of the subject.

* * * * *